Jan. 31, 1956

E. W. BYARS 2,732,647

NET CASTING APPARATUS

Filed June 8, 1953

EDGAR W. BYARS
INVENTOR

BY Robert W. Wilson

ATTORNEY

Jan. 31, 1956

E. W. BYARS 2,732,647

NET CASTING APPARATUS

Filed June 8, 1953

EDGAR W. BYARS
INVENTOR

BY Robert W. Wilson

ATTORNEY

United States Patent Office 2,732,647
Patented Jan. 31, 1956

2,732,647
NET CASTING APPARATUS

Edgar W. Byars, Tampa, Fla.

Application June 8, 1953, Serial No. 360,018

11 Claims. (Cl. 43—8)

My invention relates to fishing with nets, and has for its purpose the provision of a simple and sturdy apparatus whereby an ordinary circular spreading casting net with the usual weights on the periphery and inhaul line at the center can be thrown to greater distances and more accurately than by hand. Such nets have been used since primitive times, cast with an upward and forward twirl something like a discus throw. The picture on the back and front cover of the "Reader's Digest" for March 1954 shows a fisherman casting such a net by hand. Such a net with some modification at the top is illustrated in Figs. 1, 2 and 5 of U. S. Patent No. 1,154,563, September 24, 1915, to H. F. Dorsey, but Dorsey's apparatus gives the net a spinning drop instead of a spinning throw, so cannot reach fish further away than the length of the boom plus radius of the net. It is also within the scope of my invention to provide means whereby larger and heavier nets than it is possible to throw by hand can be used. With these and other purposes and advantages in mind, I here describe, and illustrate in the drawings appended hereto, a preferred form of my invention, together with a modification thereof, it being understood that these are by way of exemplification of my invention, and not limitations thereon.

In the specific embodiments of my invention used to illustrate the principles thereof, Fig. 1 is a side elevation of the entire mechanism showing position of parts just before the net is cast, showing the net-carrying subassembly in elevation.

Fig. 4 is an enlarged detail of a release mechanism, taken on section 4—4 of Fig. 3, and Fig. 5 is an enlarged detail of a catch, taken on line 5—5 of Fig. 1, looking down.

Figure 1:
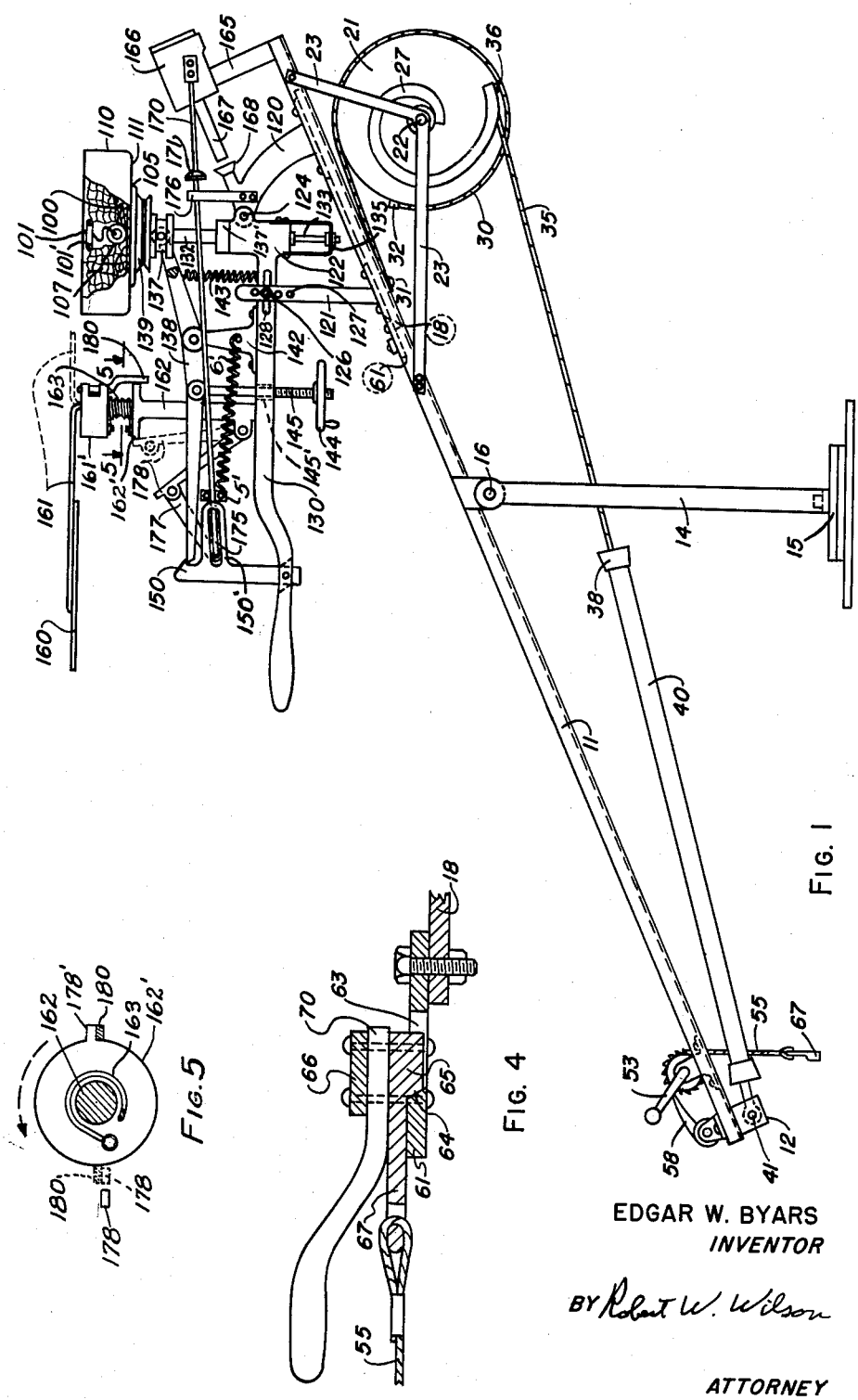
Figure 3:
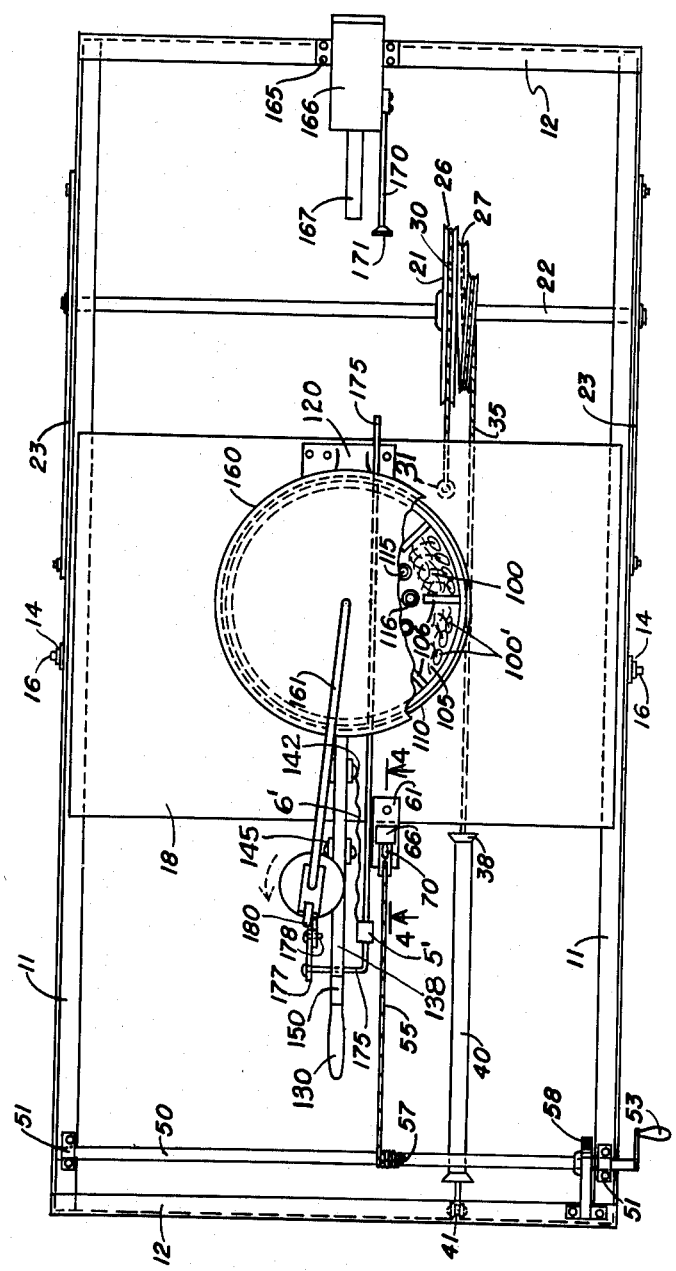
Fig. 3 is top plan view corresponding to Fig. 1, but with the carriage about midway of its forward travel.

Referring now particularly to Figs. 1 and 3, a preferred embodiment of my apparatus consists of a net-carrying subassembly suitably mounted to travel on a runway while revolving and arranged to release the net with a whirling throw at the end of the travel, all as described in detail hereafter. The runway may be made of side rails 11 formed into a rigid frame with cross bars 12, mounted for swinging and tilting on a yoke 14 which includes suitable pivots such as 15 for swing and 16 for tilt; and a carriage 18, movable along said rails by suitable mechanism described in detail hereafter. The entire mechanism is intended for mounting on the desk of a fishing boat or other suitable platform.

The preferred form of carriage-moving mechanism comprises a wheel 21 fixed to a transverse shaft 22 rotatably mounted in brackets 23 rigidly attached beneath the upper end of the runway. The wheel 21 is provided with a circular peripheral groove 26 and a spiral groove 27, which for convenience of manufacture may be assembled to one face of the wheel 21. A traversing cable 30 is attached at one end 31 to the carriage and at the other end 32 into the groove 26, the travel of the carriage 18, length of the cable 30 and the circumference of the wheel 21 being so proportioned that somewhat less than a complete revolution of the wheel will move the carriage through its entire run. In Fig. 1 the carriage is shown just short of the upper end of its run. A power-applying cable 35 has one end attached as shown at 36 to the outer end of the spiral groove 27 and the other end by means of a thimble 38 to a force-storing device such as a heavy rubber strap 40, the latter being anchored to the lower cross bar 12 of the frame, as at 41.

Retraction of the carriage 18 to the lower end of the runway is accomplished by means of a cross shaft 50 rotatable in suitable bearings 51 at the lower end of the runway, here shown as actuated by a hand crank 53 although mechanical power could of course be used. A retracting cable 55 is secured at one end to the carriage 18 by a release latch, which may be constructed as shown in detail in Fig. 4, and the other end to the shaft 50, as at 57, to be wound on the shaft when the crank 53 is turned. When the carriage 18 is thereby retracted, the traversing cable 30 rotates the wheel 21 counterclockwise, the power-applying cable 35 winds into the spiral groove 27, commencing at the end having larger radius, and the rubber strap 40 is tensed. A pawl and ratchet 58 prevents unwinding of the retracting cable 55.

The preferred form of latch herein illustrated comprises a base plate 61 bolted to the carriage 18, and certain parts associated therewith. A hole 63 in the plate is beveled upwardly on its rear edge 64, for engagement by a complementary face of a lug 65. A heavy strap 66 is bolted across the hole 63, but spaced above the plate 61 somewhat further than the thickness of the lug. A backward-pointing finger 67, conveniently made integral with the lug 65, holds the forward end of the retracting cable 55. When the latch is engaged, the parts occupy the position shown in Fig. 4, are locked in place by a key 70 fitting between the top of the lug and the under side of the strap 66 and are unlocked by pulling out the key 70, so that the lug 65 can slide up on the bevel 64, disengaging from the plate 61.

Figure 2:
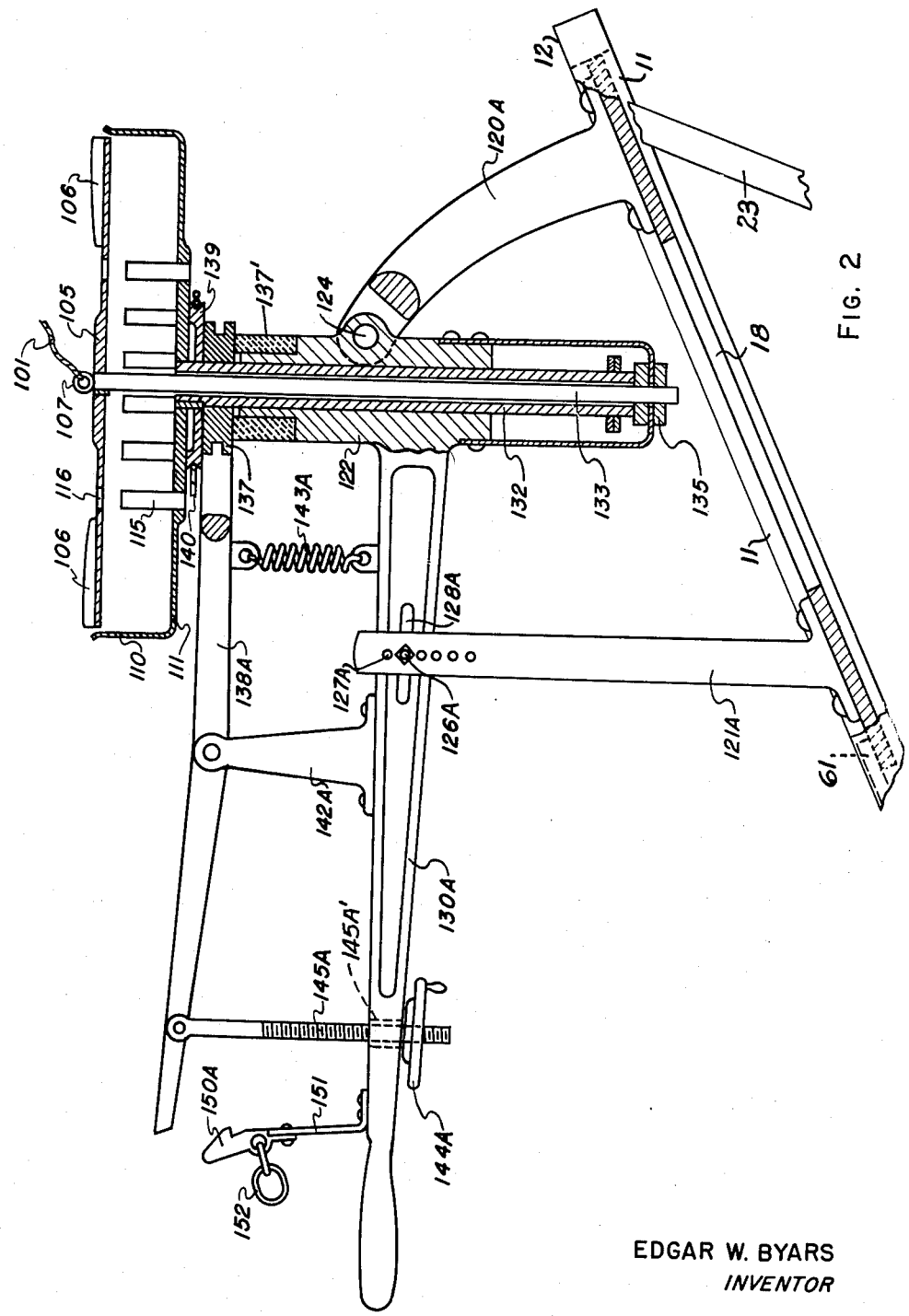
Fig. 2 is a side elevation of part of the runway and carriage of Fig. 1 on a larger scale, but illustrating a simpler mounting for the same net-carrying subassembly, with the subassembly in central vertical longitudinal section.

The net 100 is any ordinary type of casting net having weights 100' around the edge and a hauling line 101, Fig. 2, in the middle, all well-known in the art.

The construction of such a net is shown in the Dorsey patent, with weights (elements 68 in Dorsey) on the rim rope to spread the net in throwing and sink it when it hits the water. The net is closed by interior cords usually called "brails" (Dorsey's member 65), gathered together through a top ring and fastened to the inhaul line, applicant's member 101. Pull on the inhaul first closes the net by the pull on the brails (the start of this action is shown in Dorsey's Fig. 1) and then hauls it into the boat. In the conventional casting net, sold in fishing supply stores and usable with my invention, the functional equivalent of Dorsey's head 63' is a simple ring 101', my Fig. 1, Dorsey's elements 67 and 44 are omitted, and the upper ends of the brails (Dorsey's cords 65) are fastened directly to a rope, my element 101, corresponding to Dorsey's element 18.

In using my apparatus the net is laid on a rotatable circular table 105, with the weights 100' disposed around the table edge, Fig. 3. Several radial floor cleats 106 evenly disposed around the table impart the rotation of the table to the weights and the net. The weights are not shown in Fig. 1 because of the small scale of the drawing, and actually would be covered by the net in Fig. 3, but the net is broken away in that figure to show the cleats. The inboard end of the hauling line is secured to a central swivel 107. The upstanding rim 110 of a tray 111 surrounds the table 105 until the carriage reaches the end of its forward travel, just to the right of the position shown in Fig. 1, but drops out of the way as shown in Fig. 2 at the end of the travel, allowing the weights to fly out and spread the net during the cast. Fingers 115 are fixed upright on the tray in a circular pattern, at about half the tray radius. When the tray is up these project through corresponding holes 116 in the table 105 to transmit rotation to the table and to the net.

The table and tray subassembly, with its associated mechanism, is mounted on the carriage 18 by two standards 120 and 121, Fig. 1. A sleeve 122 is connected by a horizontal pivot 124 to the front standard 120, and can be set by any suitable device into a position that will keep the table and tray level when the runway is tilted. The device illustrated comprises a pin 126 passing through the selected one of series of holes 127 in the rear standard and through a slot 128 in an arm 130 fixed at right angles to, and extending rearwardly from the sleeve 122. A hollow shaft 132 and a longer solid shaft 133 are mounted coaxially and rotatably through the sleeve 122. The shaft 133 which rotates the table 105 is held against axial movement by a bottom step bearing 135, while the hollow shaft 132, which both rotates and translates the tray 111, keyed to the shaft, is movable up and down by any usual mechanism, such as a collar 137 and a shift lever 138 of the first class, Fig. 1. A preferred means of rotating the table 105 and tray 111 is by means of a pulley 139, also keyed to shaft 132. A few turns of a lanyard 140 are taken around the pulley, as in starting small gasoline motors. The shift lever is pivoted to a post 142 on the arm 130 and biased downward by a tension spring 143. The outer end of the shift lever can be moved down by any suitable means such as a hand wheel 144 acting as a nut to pull down a threaded rod 145 pivoted near the outer end of the shift lever, thus raising the tray 111 and pins 115 to the position of Fig. 1. An undercut latch 150 engages over the free end of the shift lever, to hold the tray 111 up against gravity and the pull of the spring 143. After the shift lever 138 is latched, the wheel 144 is backed off to the position shown in Fig. 1, so that the rod 145 can travel up through a clear aperture 145' in the fixed arm 130 when the latch is released.

In the form shown in Fig. 1 and Fig. 3, intended for large, heavy nets, the tray 111 is covered by a lid 160 during the rapid forward travel of the carriage so that no strands of the net will start to blow out of the tray. Just before the end of the forward travel the lid is automatically swung back out of the way. The lid and its operating mechanism are shown in closed position in Fig. 3 and in open position in the solid lines of Fig. 1, with further details in Fig. 5. The lid 160, its carrying arm 161, a horizontally revoluble head 161' and a downward finger 180 all form a rigid system pivoted on the top of an upright 162 rising from the arm 130. The lid is thus swung horizontally through a half circle from the position of Fig. 3 (also partially indicated by the dotted position of 161 in Fig. 1) covering the tray, to the solid line position of Fig. 1, out of the way of the cast. A coiled spring 163 surrounding the upright 162 above a horizontal flange 162', fastened at bottom to the flange and at top to the head 161', furnishes power for the swing. Manual clockwise motion of the lid system loads the spring, and an upstanding bottom-pivoted catch 178, when in the dotted position of Figs. 1 and 5, stands in the path of the finger 180, preventing rotation. Back swing of the catch to solid line positions of Figs. 1 and 5 by a lost motion linkage described below releases the finger so that the spring swings the lid back (dotted arrow, Fig. 5). Overtravel of the lid system is prevented by a stop 178' on the forward rim of the flange 162', in the path of finger 180.

After the lid swings away the latch 150 is automatically tripped, allowing gravity and the spring 143 to quickly drop the tray 111, allowing the weights 100' to fly out and spread the net while momentum carries it in a forward and upward trajectory as the carriage 18 completes the remainder of its travel. A rubber ring 137' on the upper end of the sleeve 122 cushions the drop of the tray. In Fig. 3 only the handle of arm 130 is visible because the lever 138 is approximately the width of the arm and directly above it. The tripping mechanism is as follows:

A post 165 on the upper cross bar 12 carries a dashpot 166, with external plunger 167 adapted to be struck by a bumper 168 on the front standard 120, thereby easing the shock of stopping the carriage 18. A rigid rod 170, with an enlarged head 171, is fixed to the side of the dashpot extending inwardly and approximately horizontally. Shortly before the carriage 18 ends its forward travel, a long rod 175, above and roughly parallel to the arm 130, strikes the head 171. This rod, guided in a forward support 176, is bent leftward 90° at its rear end, see Fig. 3. The short leg so formed passes loosely through an approximately horizontal slot in a forwardly-directed arm 150' integral with the latch 150. A link 177 connects the end of the short leg and the upper part of an upstanding catch 178, so that movement of the rod forward relatively to the carriage sets the catch in the dotted position of Figs. 1 and 5, while relative backward movement throws the catch off, to the solid line position of the same figures. A clamp 5' connecting a horizontal spring 6' to the rod, and anchored to the post 142, tends to keep the rod 175 in the forward position, thus holding the catch 178 in dotted position. The length of the rod is such that before the end of forward travel of the carriage 18 the front end of the rod stops against the stationary head 171. Consequently further travel of the carriage (equivalent in effect to backward movement of the rod), first knocks in effect to backward movement of the rod), first knocks off the catch, then, after a sufficient interval to allow the head 160 to swing out of the way, knocks off the latch 150. The interval is governed by the length of the horizontal slot.

In operation the carriage 18 is retracted to the lower end of the runway by winding the cable 55 on the shaft 50. This unwinds the cable 30 from the groove 26 but at the same time winds the cable 35 in the spiral groove 27. The smaller radius portion of the spiral is offset further from the face of the wheel 21 than is the larger radius portion (see Fig. 3), so that the cable 35 always clears the spiral element, winding and unwinding. While the carriage is held at the lower position by the pawl and ratchet 58, the catch 178 is tripped manually, to swing the lid clear so that the net can be loaded and properly folded on the table 105, inside the raised tray 111. After loading, the lid is swung manually to closed position. The runway 11, 12 is moved to the desired elevation and direction on pivots 16 and 15 to aim the apparatus to cast the net where desired. The table 105 and tray 111 will be set level by placing the pin 126 in the proper hole 127.

To throw the net, while the operator holds the runway at the intended direction and elevation, the key 70 is pulled out, which allows the lug 65 to ride over the edge 64, and the force of the stretched elastic strap 40 unwinds the cable 35 from the spiral groove 27, turning the wheel 21 and so winding the cable 30 into the groove 26, pulling the carriage rapidly and strongly to the upper end of the runway. As the carriage starts, the net-carrying subassembly is put into rapid rotation. This can be done manually by pulling the lanyard 140. If it is desired to cast the net less than the maximum distance of which my invention is capable, the carriage 18 is pulled only part way down the runway. It will be seen from the drawings that the carriage can be held by the pawl and ratchet 58 at any position along the side rails 11.

The spiral groove 27 to receive the cable 35 is the preferred method of causing the carriage to start its movement easily and to build up speed as it travels. Since the effective radius whereon the power-applying cable 35 acts is small at starting, the full power of the elastic strap 40 is applied to a short lever arm, and as the force left in the strap diminishes it pulls the cable on a larger radius, thus increasing the mechanical advantage so that the carriage increases in speed as it travels forward.

In small sizes of my invention the net-carrying subassembly heretofore described may be mounted on the carriage 18 by a simpler superstructure and with simpler stopping and releasing arrangements, all as shown in Fig. 2. The mounting is by front and rear standards 120A and 121A. The differences from the Fig. 1 disclosure consist of the omission of the post 165 and dashpot 166 from the runway, so that the front edge of the carriage 18 stops against the front crossbar 12 of the runway; the omission of the bumper 168 from the front standard 120A; the omission of the automatic latch-operating mechanism (elements 170, 171, 175, 177 and 178); and the use of a latch of different style from 150. In the form shown in Fig. 2 the latch 150A is carried by the top of an upstanding inward-tending leaf spring 151 and is released by the operator pulling a chain 152 when the carriage nears the end of its run, or by securing the free end of the chain at such a distance as to pull the latch off when the carriage nears the end of its run. The standards 120A and 121A, pin 126A, holes 127A, slot 128A, arm 130A, shift lever 138A, post 142A, threaded rod 145A and handwheel 144A all correspond in function and operation to the elements of the same numbers without the "A" in Fig. 1, already described.

It will be understood that although I have described and shown certain preferred embodiments of my invention, these are for purposes of illustration and not of limitation.

What I claim is:

1. A net-casting apparatus comprising in combination, rotatable net-carrying means, means for holding a net thereon, means for imparting translatory motion to said rotatable means, and means for releasing said net from said holding means at a selected point in said translatory motion, during rotation of said net-carrying means.

2. A net-casting apparatus comprising in combination, rotatable net-carrying means, means for holding a net thereon, means for imparting forward and upward motion to said rotatable means, and means for releasing the net from said holding means at a selected point in said forward and upward motion.

3. In a net-casting apparatus in combination, a table whereon a net of the circumferentially spreading type can be laid, means constraining said net to rotate with said table, means for imparting rotary and diametral motion to said table, and means for withdrawing said constraining means from contact with the net.

4. In a net-casting apparatus in combination, a table whereon a net of the circumferentially spreading type with peripheral weights can be laid, means constraining the elements of the net to rotate with said table, means restraining the net from spreading, means for imparting rotary and diametral motion to said table, and means for withdrawing said constraining and restraining means from contact with the net.

5. In a net-casting apparatus in combination, a table whereon a net of the circumferentially spreading type with peripheral weights can be laid, means constraining the elements of the net to rotate with said table, means restraining the net from spreading, means for imparting rotary and diametral motion to said table, and means for withdrawing said constraining and restraining means from contact with the net at a selected point in said diametral motion.

6. In a net-casting apparatus in combination, a table whereon a net of the circumferentially spreading type can be laid, radial cleats on said table adapted to engage the net, fingers extending above the surface of said table between the center and edge thereof also adapted to engage said net, a surrounding rim above the table level, means for imparting rotary and diametral motion to said table, and means for lowering said fingers and said rim to permit the net to spread.

7. In a net-casting apparatus in combination, a table whereon a net of the circumferentially spreading type can be laid, fingers extending above the surface of said table adapted to engage the net, a surrounding rim above the table level, a lid removably positioned above said rim, means for rotating said table and finger subassembly, means for imparting translatory movement to said subassembly and said lid with it, and means for successively removing said lid and lowering said fingers and rim at selected points on said translatory movement to permit the net to rise and spread.

8. A net-casting apparatus comprising in combination, a circular net-supporting table, a marginal rim around said table, means for moving said rim up and down selectively to enclose or to clear said table, a carriage supporting said table, a track whereon said carriage is movable in a direction diametral to said table, and means for traversing said carriage along said track simultaneously with imparting rapid rotation to said table.

9. A net-casting apparatus comprising in combination, a circular net-carrying table, a net centrally attached thereto, a series of fingers coaxially disposed and defining an inner circumference of said table, a marginal rim surrounding said table, and common means for moving said fingers and said rim up and down selectively either to engage or to clear said net; a carriage supporting said table, a track whereon said carriage is movable in a direction diametral to said table, means for traversing said carriage along said track, and means for simultaneously imparting rapid rotation to said table.

10. The elements of claim 9, wherein said traversing means comprises in further combination a force-storing element, a flexible connector between said force-storing element and a wheel mounted below and axially transverse to said track, said wheel having two grooved faces respectively spiral and circular, said connector being laid upon said spiral face with its portion first payed off lying upon the inner portion of the spiral; another flexible connector laid upon said circular face, fastened at one end thereto and fastened at its other end to said carriage, quick-release means adapted to hold said carriage against the impulse of said force-storing element, all whereby said force-storing element is adapted to cause rotation of said wheel with increasing speed, and corresponding movement of said carriage.

11. A carriage-traversing mechanism comprising in combination, a carriage, a track whereon said carriage is forwardly movable, a wheel, connecting means between said wheel and said carriage for moving said carriage forward as said wheel rotates, a tension element, a cable connecting said tension element and said wheel, a spiral surface on said wheel whereon said cable is laid successively from the lesser to the greater circumference of said spiral when said tension element is tensed, whereby the force of said tension element, when released, is applied with successively increasing leverage to said wheel, thereby approximately balancing the diminishing pull of the tension element.

References Cited in the file of this patent

UNITED STATES PATENTS

| | | |
|---|---|---|
| 876,148 | Cloud | Jan. 7, 1908 |
| 1,154,563 | Dorsey | Sept. 21, 1915 |
| 2,565,955 | Dobreff | Aug. 28, 1951 |